UNITED STATES PATENT OFFICE.

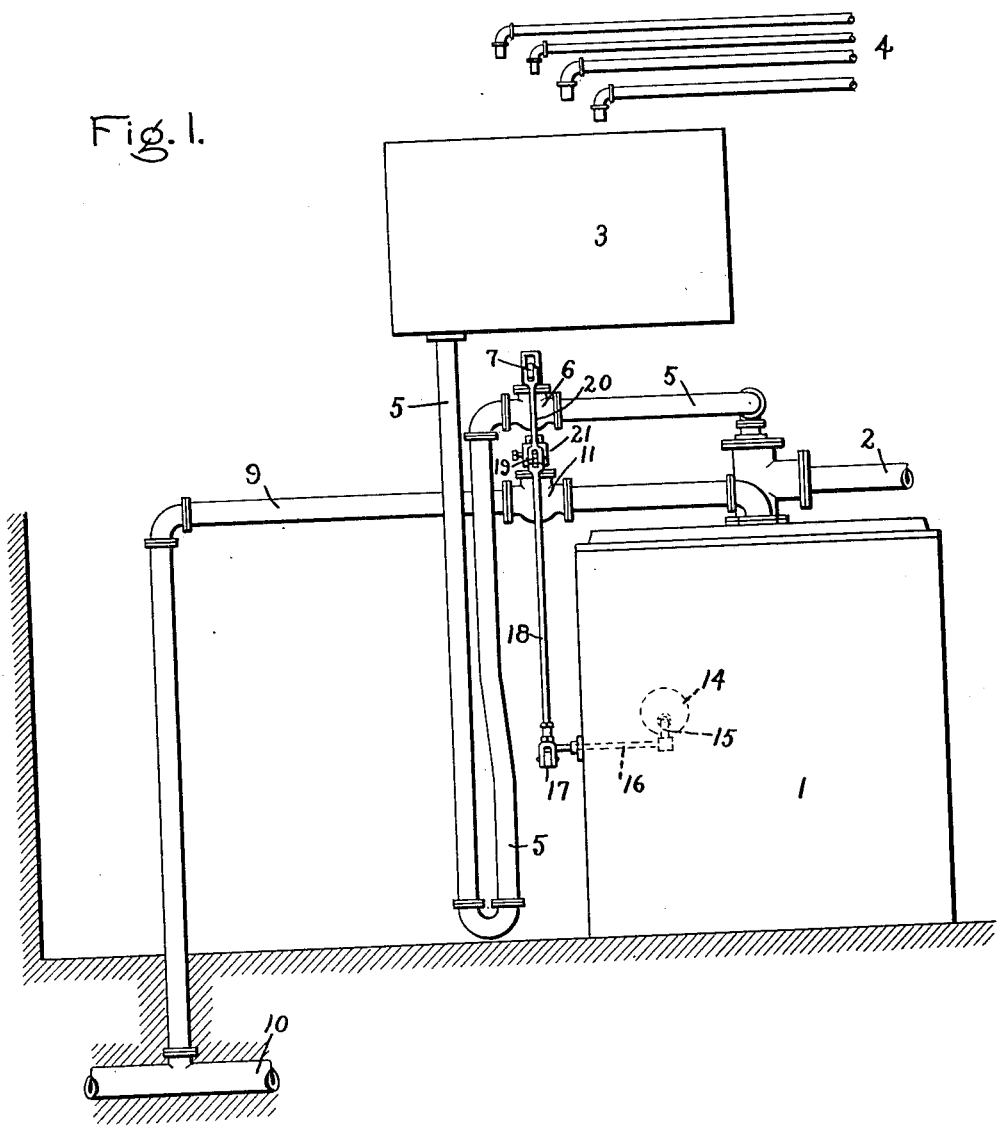

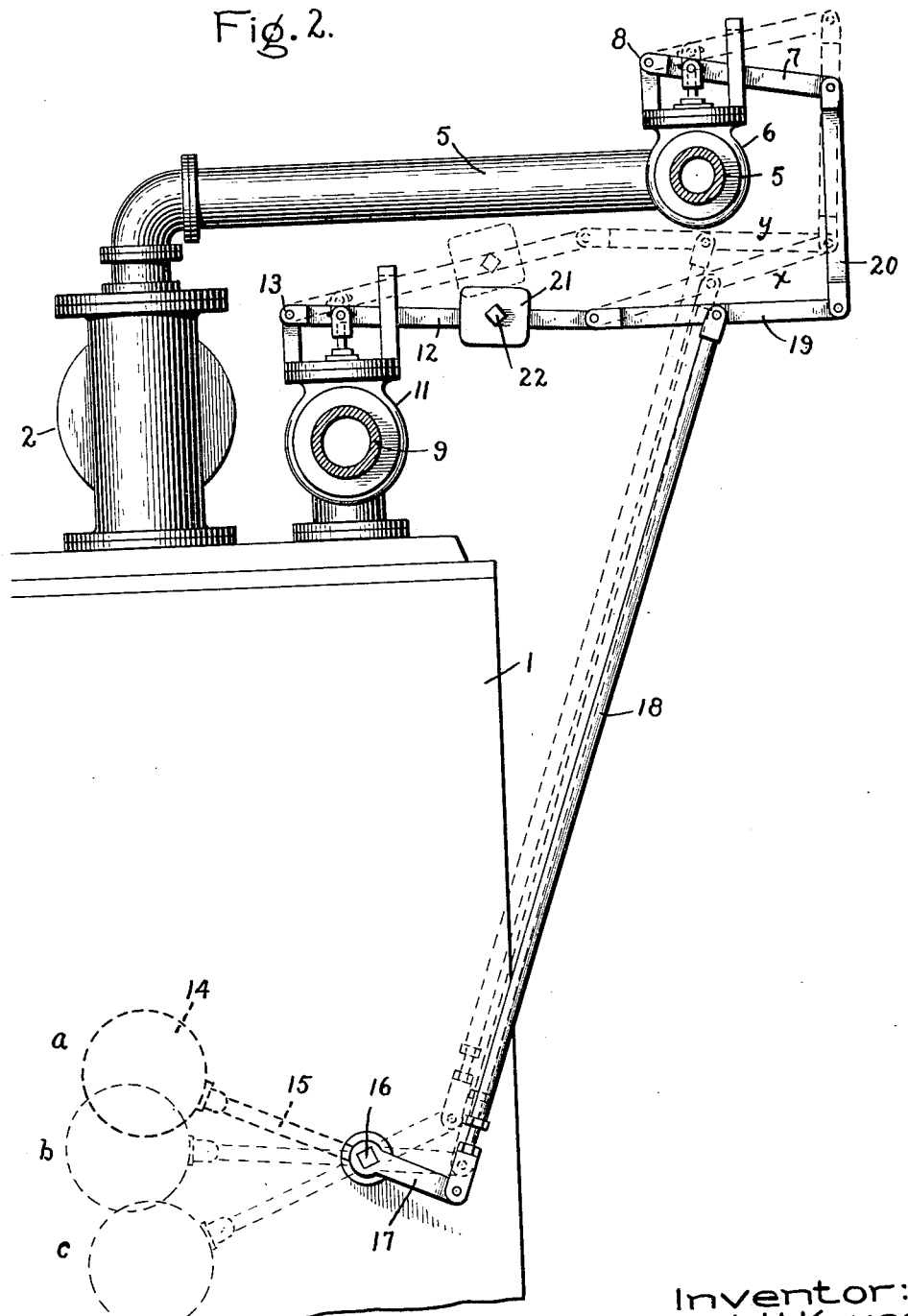

AUGUST H. KRUESI, OF SCHENECTADY, NEW YORK, ASSIGNOR TO GENERAL ELECTRIC COMPANY, A CORPORATION OF NEW YORK.

WATER-SUPPLY SYSTEM.

1,085,272.  Specification of Letters Patent.  Patented Jan. 27, 1914.

Application filed September 18, 1911. Serial No. 649,793.

*To all whom it may concern:*

Be it known that I, AUGUST H. KRUESI, a citizen of the United States, residing at Schenectady, county of Schenectady, State of New York, have invented certain new and useful Improvements in Water-Supply Systems, of which the following is a specification.

This invention relates to systems of maintaining a supply of water at or near a constant level in a supply tank, and its object is to utilize the water warmed by passage through various auxiliary apparatus, and to make up any deficiency in supply by cold water drawn from the city mains or other suitable source. In the operation of a large power plant, a great quantity of water is required for cooling purposes, not only in the condensers for the steam engines, but in the water jackets of gas engines, air compressors, dry vacuum pumps and turbine bearings, the coolers and filters for the lubricating system, the cooling coils of transformers and mercury arc rectifiers, etc. This water takes up a large quantity of heat, and my invention aims to save this heat or the water or both by using the water to feed the steam boilers. But since it may not always be sufficient in quantity, provision is made for drawing upon some additional source of supply, such as the city mains. I believe the invention would be useful in other applications, as for instance in transformer sub-stations the cooling water might be saved for use in a house service tank for sanitary purposes, etc. The feed pipes conveying the warm water and the cold water are each provided with a controlling valve, and the two valves are operated by a float in the tank or heater from which the feed water is pumped to the boiler or other apparatus. The mechanism is such that when the float falls it opens first the warm water valve, and when that is wide open the cold water valve is gradually opened. In closing, the cold water valve shuts before the warm water valve. By this arrangement the supplemental or "make-up" water supply is drawn upon only when the warm water supply is insufficient, and the supplemental supply is shut off as soon as there is no further necessity for it.

In the accompanying drawings, Figure 1 is a diagrammatic front view of a feed water system embodying one mode of carrying out my invention, and Fig. 2 is a side view of the valves and their operating mechanism, on a larger scale.

The tank 1 is a reservoir or heater for feed water which can be withdrawn through a pipe not shown but connected to the tank or heater 1 at a point below the float. At 2 is a pipe for the return to the reservoir for use in the boilers, in the case under description, of water from the hotwell pump of a surface condenser or other source from which it may be desirable to return water or condensed steam when available, without automatic control. At 3 is a collecting tank into which empty a plurality of pipes 4 conveying warm water from the jackets of the several cooling-appliances installed in or near the power house. A pipe 5 conducts the warm water from the tank 3 to the tank 1, said pipe being controlled by a valve 6, whose valve stem is pivoted to a lever 7 fulcrumed at 8. Cold water is supplied to the feed water tank 1 through a pipe 9 taking its supply from some suitable source such as the city main 10. A valve 11 controls the pipe 9, its valve stem being pivoted to a lever 12 fulcrumed at 13.

In the feed water tank 1 is a float 14 attached to an arm 15 on a rock shaft 16, which extends through a suitably packed bearing in the wall of the tank. An arm 17 is secured to the outer end of said shaft, and is connected by a long rod 18 of adjustable length with an intermediate point on a floating lever 19 pivoted at one end to the outer end of the lever 12. The other end of the floating lever 19 is connected by a link 20 with the outer end of the lever 7. A weight 21 may be arranged to slide along the lever 12, with a set screw 22 for fastening it when it has been properly adjusted.

The operation is as follows:—In the drawings, the parts are shown in the positions they occupy when the feed water tank 1 is full: the float 14 standing at position *a*, and both valves 6 and 11 being closed. When by reason of the demand for feed water, the float 14 drops to position b, it rocks the shaft 16, and the arm 17 pushes up the rod 18 and the floating lever 19. The lever 12 is held stationary by the weight 21, so that the floating lever 19 fulcrums on the outer end of said lever 12, and moves up to the position x shown in dotted lines. In so doing, it lifts the link 20 and opens the valve 6, which admits warm water from the collecting tank 3 to the feed water tank 1. If the supply of warm water is not enough to meet the demand of the feed water pump, the float will continue to fall toward the position c. The valve lever 7 is now stationary in its upper position, and serves as an abutment for the link 20, whose lower end acts as the fulcrum for the floating lever 19. The drop of the float causes the rod 18 to push said lever 19 up to the position y and in so doing to open the cold water valve 11, thereby supplementing with cold water the deficiency in the warm water supply.

When the demand for feed water slackens, and the tank begins to fill up again, the rising of the float pulls the rod 18 downward and the levers go back toward or to their original positions. They do this, however, in the reverse order in which they operated when the float dropped, because the weight 21 forces down the lever 12 and keeps an upward thrust on the link 20 until the cold water valve is completely closed; after which the lowering of the rod 18 pulls down the lever 7 and shuts the valve 6.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In a water supply system, the combination of a tank or receptacle, two sources of supply for the tank, one of which is adapted to supply warm water exhausted from auxiliary apparatus and the other cold water from a suitable source, valves respectively controlling said sources, and means responsive to variations in the quantity of water in the tank for automatically opening and closing the valves, which means opens the warm water valve to substantially full flow capacity before opening the cold water valve and closes the valves in the reverse order.

2. In a water supply system, the combination with a tank, two sources of supply for the tank, one of which is adapted to supply warm water exhausted from various cooling devices and the other is adapted to supply cold water from a suitable source, and valves controlling the respective supplies, of means including a system of levers and rods, and a device responsive to variations in the level of the water in the tank for automatically opening the warm water valve in advance of the other and for closing said valve after the other.

3. In a feed water supply system for a boiler, the combination with a water tank, of sources of warm and cold feed water, two supply pipes which lead from the respective sources to the tank, a valve in each pipe, a float in the tank, and operative connections between the float and the valves whereby the warm water valve is opened to substantially full flow capacity before the cold water valve is opened and said valves are closed in the reverse order.

4. The combination with a water tank, of two supply pipes therefor, a valve in each pipe, a lever for each valve, a float in said pipe, a lever for each valve, a float in said tank, and operative connections between said float and said levers, whereby one valve will be opened earlier and closed later than the other.

5. The combination with a water tank, of two supply pipes therefor, a valve in each pipe, a lever for each valve, a float in said tank, a rod actuated by said float, and a floating lever pivoted to said rod and actuating the valve levers, opening one valve earlier and closing it later than the other.

6. The combination with a water tank, of two supply pipes, a valve in each pipe, a lever for each valve, a floating lever pivoted at one end to one valve lever, and connected with the other valve lever at its other end, a float in said tank, and a rod actuated by said float and pivoted to said floating lever at an intermediate point.

7. The combination with a water tank, of two supply pipes, a valve in each pipe, a lever for each valve, a floating lever pivoted at one end to one valve lever, an adjustable weight on said valve lever, a link connecting the other end of said floating lever with the other valve lever, a float in said tank, and a rod actuated by said float and pivoted to said floating lever at an intermediate point.

8. The combination with a main water supply tank, of an auxiliary water tank or receptacle, means adapted to supply warm water exhausted from cooling means of auxiliary apparatus to said receptacle, a connection between the auxiliary tank and the main tank, a valve in the connection, a conduit for supplying cold water to the main tank from a suitable source, a valve in the conduit, and means for opening and closing the valves in response to variations in the quantity of water in the main tank, said means opening the warm water valve to substantially full flow capacity before opening the cold water valve and closing the valves in the reverse order.

In witness whereof, I have hereunto set my hand this 16th day of September, 1911.

AUGUST H. KRUESI.

Witnesses:
 HELEN ORFORD,
 GEO. P. WHITTLESEY.

Copies of this patent may be obtained for five cents each, by addressing the "Commissioner of Patents, Washington, D. C."